(No Model.)
W. F. DUNCAN & G. A. FULLERTON.
LAMP.
No. 425,498. Patented Apr. 15, 1890.
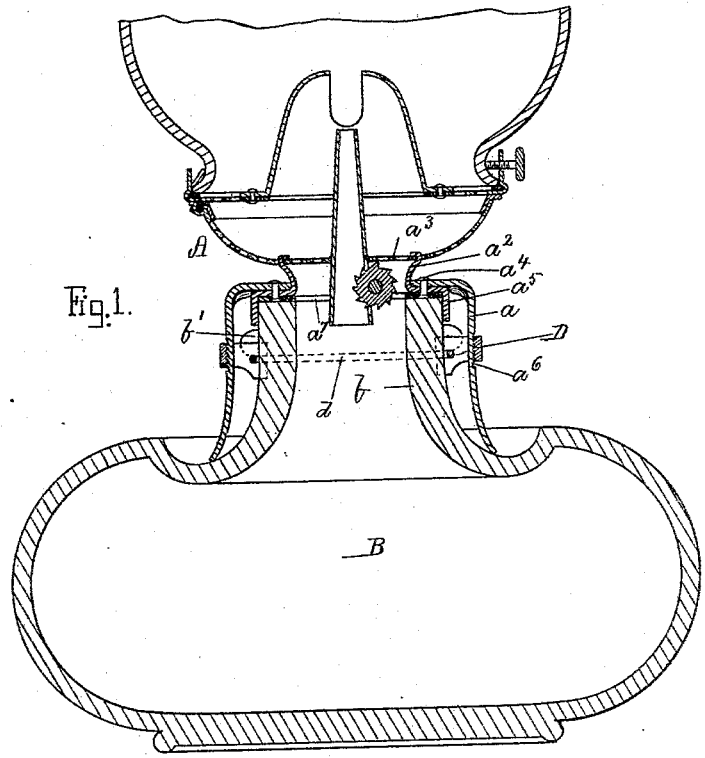
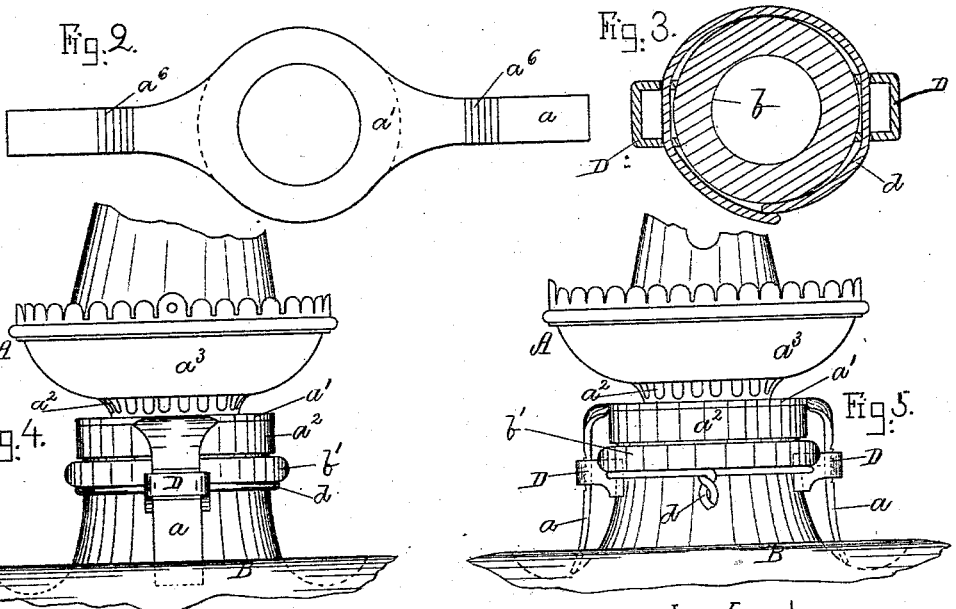
Witnesses
Edward S. Beach
John R. Snow
Inventor
W. F. Duncan and
Geo. A. Fullerton

UNITED STATES PATENT OFFICE.

WILLIAM F. DUNCAN, OF NEW YORK, N. Y., AND GEORGE A. FULLERTON, OF BOSTON, MASSACHUSETTS, ASSIGNORS TO THE FACILE BOTTLE STOPPLE COMPANY, OF NEW YORK, N. Y.

LAMP.

SPECIFICATION forming part of Letters Patent No. 425,498, dated April 15, 1890.

Application filed March 5, 1888. Serial No. 266,138. (No model.)

*To all whom it may concern:*

Be it known that we, WILLIAM F. DUNCAN, of New York, in the county and State of New York, and GEORGE A. FULLERTON, of Boston, in the county of Suffolk and State of Massachusetts, have invented a new and useful Improvement in Lamps, of which the following is a specification, reference being had to the accompanying drawings, in which—

Figure 1 is a vertical central section of one form of lamp embodying our invention. Fig. 2 is a plan of a blank from which a part of one form of holding device is made. Fig. 3 is a section on line 3 3 of Fig. 4, and Figs. 4 and 5 are elevations of portions of that form of lamp shown in Fig. 1.

The main feature of our invention is a burner a portion of which forms a bail which is provided with spring-legs to engage with fastening devices on the body of the lamp, our improved lamp being in these respects analogous to a bottle and its stopple when the stopple is held in place by a bail, the legs of which engage fastenings connected with the bottle, for in our improved lamp the burner (and its chimney when a chimney is used) are connected with or formed in one piece with a metallic bail whose legs project downward and can be readily engaged with and disengaged from fastening devices which are connected with or formed in one piece with the body of the lamp.

In the drawings, which show our invention embodied in the form which we prefer on the whole to all other forms known to us, A is the burner, and B the lamp. Burner A is in all respects like many burners now in use, save that it is provided with a bail preferably formed from the sheet-metal blank shown in Fig. 2, the legs $a$ projecting from ring $a'$, in which a thimble $a^2$, connecting base $a^3$ of burner A to the bail, is secured. Rivets $a^4$ are preferably used to keep the thimble from turning in the ring $a'$ and for clamping the two together. That end of the thimble which is nearest the bail has a flange $a^5$, which fits the neck $b$ of body B. The legs $a$ are toothed at $a^6$ to engage teeth on the inner surface of the holding devices D, which are, as shown, held to the neck $b$ against a rib $b'$ by means of a wire $d$. It will be obvious that the burner A, mounted upon the bail, can be readily secured to the lamp by inserting the legs $a$ through the devices D, the teeth upon the legs then catching the teeth of the devices D and holding the burner securely in place. To make a tight joint between the end of the lamp-neck $b$ and the burner, we interpose between the thimble and the end of the lamp-neck a washer $a^7$, which is secured to the thimble and the ring $a'$ by rivets $a^4$. When it is desired to raise or remove the burner for filling the lamp, all that is necessary to do is to press inwardly the inner or lower ends of the legs $a$ and move them outwardly through the parts D.

The other parts of the burner not herein referred to are old and well known and require no description, as they form no part of our invention.

What we claim as our invention is—

The combination of a burner having two or more spring-legs with an oil-receptacle provided with exterior holding devices, the spring-legs extending through the holding devices and engaging the same, substantially as and for the purpose set forth.

W. F. DUNCAN.
    GEO. A. FULLERTON.

Witnesses:
 J. E. MAYNADIER,
 G. H. P. FLAGG,